(12) United States Patent
Inoue

(10) Patent No.: US 6,318,762 B2
(45) Date of Patent: Nov. 20, 2001

(54) PIPING STRUCTURE

(75) Inventor: Tomoki Inoue, Inuyama (JP)

(73) Assignee: Tokai Rubber Industries Ltd. (JP)

( * ) Notice: Subject to any disclaimer, the term of this patent is extended or adjusted under 35 U.S.C. 154(b) by 0 days.

(21) Appl. No.: 09/791,796

(22) Filed: Feb. 26, 2001

(30) Foreign Application Priority Data

Feb. 24, 2000 (JP) .................................................. 00-047230

(51) Int. Cl.$^7$ ...................................................... F16L 35/00
(52) U.S. Cl. .............................. 285/81; 285/87; 285/114; 285/921
(58) Field of Search ................................ 285/81, 87, 88, 285/114, 305, 313, 319, 93, 921

(56) References Cited

U.S. PATENT DOCUMENTS

| | | | |
|---|---|---|---|
| 2,509,925 | * 5/1950 | Ison | 285/87 |
| 3,249,370 | * 5/1966 | Brogden | 285/114 |
| 3,484,736 | * 12/1969 | Wyse | 285/114 |
| 3,881,753 | * 5/1975 | Bochory | 285/114 |

FOREIGN PATENT DOCUMENTS

| | | | |
|---|---|---|---|
| 2012385 | * 7/1979 | (GB) | 285/114 |
| 9-269008 | * 9/1997 | (JP) . | |

* cited by examiner

Primary Examiner—Eric K. Nicholson

(57) ABSTRACT

A first bracket 16 is fixedly mounted by swage locking to a female connector 10 which is fixedly joined at one end with a resin tube 9 while a second bracket 20 is fixedly mounted by welding to a corresponding pipe 11. When an insertion end 11a of the corresponding pipe 11 is inserted into the other end of the female connector 10, the first bracket 16 and the second bracket 20 are turned relative to each other and about the axis of a second connecting end portion 6 of the female connector 10 so that a coupling hole 18a provided in the first bracket 16 and a coupling hole 22a provided in the second bracket 20 are coincided with each other across which a bolt or an anchor clip is inserted and tightened.

3 Claims, 4 Drawing Sheets

PIPING STRUCTURE

BACKGROUND OF THE INVENTION

The present invention relates to a piping structure for joining tubes or pipes or the like in a vehicle by using a female connector and particularly to a piping structure without relative turning movement of a female connector and a pipe which are not bound by each other.

A variety of female connectors have been provided for joining tubes or pipes or the like in a vehicle. Such a female connector is generally made of a synthetic resin or metallic material which fixedly joins at one end to a resin tube or the like and in the form of a retainer at the other end to a corresponding pipe or the like as a male member, hence coupling between the resin tube and the corresponding pipe.

One of such conventional female connectors is illustrated as a quick connector in FIG. 7. The female connector denoted by 10 comprises a first connecting end portion 1 at one end for joining to the resin tube and a second connecting end portion 6 at the other end for engagement with the corresponding pipe 11 to be joined as having a retainer 2 therein. The retainer 2 may be arranged of substantially a tubular shape which becomes gradually greater in the diameter from one end to the other end. The retainer 2 is also elastically deformable by having at least one axially extending slit. Accordingly, as the retainer 2 is inserted into the female connector 10, its diameter becomes smaller until a pair of detents 2a provided on the outer surface engages with and snaps in windows 3a or concave portion provided in a housing 2 of the female connector 10.

When the insertion end 11a of the corresponding pipe 11 is inserted into the opening of the second connecting end portion 6 of the female connector 10 extending straight, an annular projection 11b provided on the outer surface of the insertion end 11a engages with a small diameter recess 2b at one end of the retainer 2 so that the insertion end 11a is concentrically and turnably joined along the axis L with the second connecting end portion 6 of the female connector 10 to prevent the corresponding pipe 11 from moving in axial direction. The retainer 2 has a pair of operating arms 4 provided integrally on the other end thereof. When the operating arms 4 are pressed inwardly In diameter direction to reduce the diameter, the retainer 2 with the corresponding pipe 11 can be removed from the female connector 10. Also, the female connector 10 has an annular sealing member 5 such as an O ring mounted to the inner wall of the housing 3 of a central region thereof.

In the piping structure having such a female connector 10, a resin tube (not shown) is irrotatably fixedly inserted onto the outer periphery of the first connecting end portion 1 of the female connector 10 while the corresponding pipe 11 joined to the second connecting end portion 6 of other end may turn about the axis L of the second connecting end portion 6 the female connector 10. Accordingly, any engine vibration of the vehicle or an unexpected vibration or small displacement or the like at the side of the resin tube or the corresponding pipe 11 may cause the female connector 10 and the corresponding pipe 11 to be turned relative to each other. When the female connector 10 and the corresponding pipe 11 are turned relative to each other, the annular sealing member 5 contacting between them will be rubbed and worn out thus, its sealing effect will be declined.

A means for inhibiting the turning movement of the female connector and the corresponding pipe relative to each other is disclosed, for example, in Japanese Patent Laid-open Publication (Heisei)9-269008 in the form of a piping structure where the female connector has two opposite flat regions provided on the outer surface thereof for inhibiting the turning movement. As shown in FIG. 6, the piping structure has a connector holder 12 later connected to the female connector 10 which has joined between a resin tube 9 and a corresponding pipe 11. While an arm 14 of the connector holder 12 snaps on the small-diameter region 10b of the female connector 10, a pair of opposite strips 13 of the connector holder 12 holds the two flat regions 10a of the female connector 10. Also, the corresponding pipe 11 is bent and held in a notch 15a provided in a flat body 15 of the connector holder 12 so that it can be inhibited from turning.

According to the conventional piping structure, as long as the corresponding pipe 11 is bent above the extension of the female connector 10, the corresponding pipe 11 can thus be inhibited from being turned relative to the female connector 10. It is however mandatory for the female connector 10 held by the connector holder 12 to have the small-diameter region 10b and the paired opposite flat sides 10a on the outer peripheral. Accordingly, the female connector of at least a round tubular shape is not permitted.

SUMMARY OF THE INVENTION

The present invention is invented in view of the above aspects and its object is to provide a piping structure which is easily applicable to any female connector regardless of the type and shape of the female connector and high in the freedom for designing while securely inhibiting the turning of the female connector relative to its corresponding pipe to be joined.

For achievement of the object, a piping structure according to the present invention is provided for use in a vehicle having a female connector and a corresponding pipe to be connected with the female connector, both arranged to join each other while allowing no relative turning movements, comprising:

the female connector of a tubular shape having a first connecting end portion thereof extending straight for connection to a resin tube and a second connecting end portion thereof extending straight for connection to the corresponding pipe;

the resin tube fixedly inserted at one end to the first connecting end portion of the female connector and extending to the other end;

the corresponding pipe having an insertion end thereof arranged for joining coaxially and turnably by snap fastening to the second connecting end portion of the female connector and extending along the axial direction; and a first bracket fixedly mounted to the periphery of the female connector for non-turning and a second bracket fixedly mounted to the corresponding pipe for non-turning, wherein when the insertion end of the corresponding pipe is inserted and connected with the second connecting end portion of the female connector, the first bracket and the second bracket turn about the axis of the second connecting end portion of the female connector relative to each other so that the connecting portion of the first bracket and the connecting portion of the second bracket are coincided and coupled with each other.

The structure of the present invention permits the female connector and the corresponding pipe to be inhibited from being turned relative to each other. Accordingly, the annular sealing member such as an O ring mounted in the female connector remains free from being rubbed by the corresponding pipe and finally worn out, hence providing its excellent sealing effect for a long-run operation. Also, the female connector, the resin tube, and the corresponding pipe are not limited in the type and shape. In particular, because the structure of the present invention is easily applicable to any female connector, its design can enjoy a higher degree of freedom.

DETAILED DESCRIPTION OF THE PREFERRED EMBODIMENTS

Figure 1:
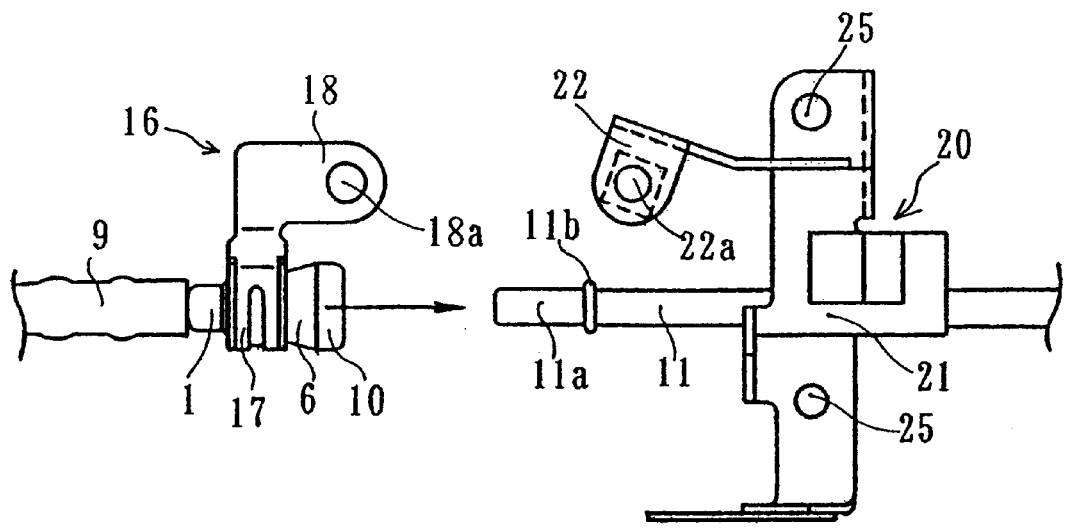
FIG. 1 is a plan view schematically showing an embodiment of the piping structure according to the present invention prior to the joining.

In the piping structure according to the present invention, a pair of the brackets are fixedly mounted to the female connector and the corresponding pipe respectively for non-turning movement and coupled with each other to join between the female connector and the corresponding pipe while inhibiting their relative turning movement. The bracket is fixedly mounted by swage locking to the female connector which is thus not limited in the type or shape or the like and needs not to have two opposite flat regions on the outer side thereof (at the width across the flats). Further, the freedom for designing the piping structure according to the present invention is carrying at its extension a corresponding pipe or a resin tube.

An embodiment of a piping structure according to the present invention will be described in more detail referring to FIGS. 1 to 3. The piping structure has a first bracket 16 fixedly mounted on the periphery of a female connector 10 so as not to be turned and a second bracket 20 fixedly mounted on a corresponding pipe 11 to be connected without turning. The first bracket 16 and the second bracket 20 are shaped and positioned so that when the corresponding pipe 11 is inserted at its insertion end 11a into the female connector 10, they can be turned relative to each other about the axis L of a second connecting end portion 6 of the female connector 10 and their coupling regions or namely a coupling hole 18a of the first bracket 16 and a coupling hole 22a of the second bracket 20 coincide with each other.

Figure 7:
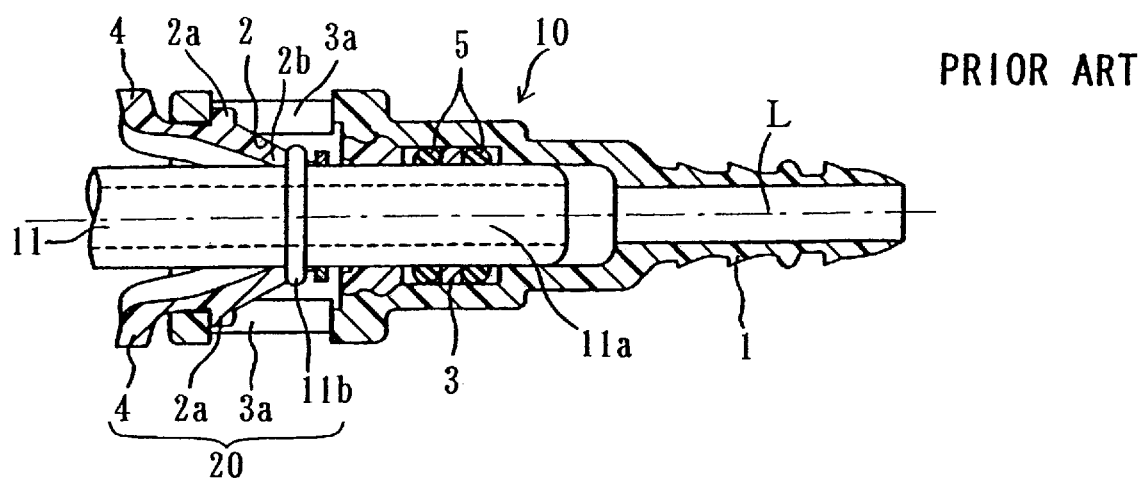
FIG. 7 is a cross sectional view schematically showing an arrangement of a female connector.

Coupling means for the first bracket 16 and the second bracket 20 is not limited to a specific scheme so long as they can not turn about the axis of the female connector 10 or of the corresponding pipe 11. Preferably, the first bracket 16 may fixedly be mounted by swage locking to the periphery of the female connector 10 while the second bracket 20 may fixedly be mounted by welding to the corresponding pipe 11. For the purpose, it is preferable that both the first bracket 16 and the second bracket 20 as well as the corresponding pipe 11 are made of metallic materials and the female connector 10 is made of a metallic or resin material. While the female connector 10 is not limited in a type or a shape as mentioned above, it is a quick connector in this embodiment which can be joined to the corresponding pipe 11 by snap fastening as shown in FIG. 7.

The first bracket 16 comprises a tubular tightening member 17 for fixedly mounting on the outer periphery of the female connector 10 and a planer coupling tab 18 extending from the tightening member 17. The coupling tab 18 has the coupling hole 18a provided therein. The second bracket 20 comprises a base member 21 made of a sheet material for fixedly mounting by welding or swage locking to the corresponding pipe 11 and a coupling tab 22 extending from the base member 21. The coupling tab 22 has the coupling hole 22a provided therein. Thus, the shapes and positions of the first and second bracket 16,20 are adjusted as mentioned above so that, as shown in FIG. 1, when the insertion end 11a of the corresponding pipe 11 is inserted into and engaged with the another end of the female connector 10, the coupling hole 22a of the second bracket 20 mounted to the corresponding pipe 11 coincides with the coupling hole 18a of the first bracket 16 mounted to the female connector 10.

More specifically, the tubular tightening member 17 of the first bracket 16 is fitted through on the second connecting end portion 6 of the female connector 10 and tightened thus to integrally join the first bracket 16 to the periphery of the second connecting end portion 6. The base member 21 of the second bracket 20 has, as shown in FIG. 3, an attachment portion 21a thereof bent into a C shape in cross section at the mid portion of the base member 21. The corresponding pipe 11 is fixedly mounted, at the outer surface of its extension extending rearwardly from the insertion end 11a, by welding to one corner of the attachment portion 21a of the base member 21.

Figure 2:
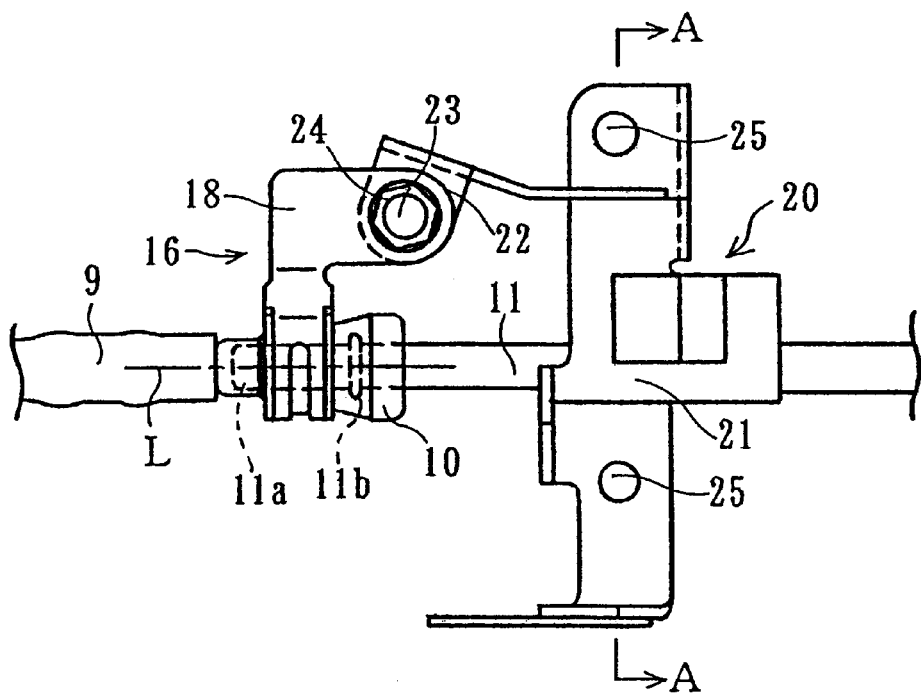
FIG. 2 is a plan view schematically showing the embodiment of the piping structure according to the present invention after the joining.
Figure 3:
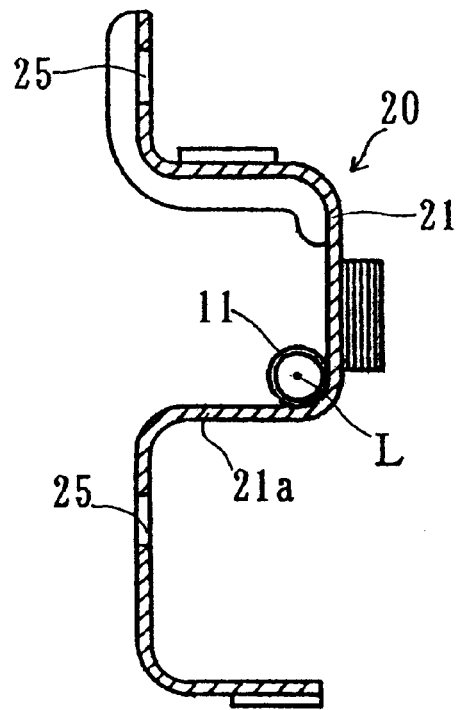
FIG. 3 is a cross sectional view taken along the line A—A of FIG. 2.

This allows the first bracket 16 and the second bracket 20 to be turned relative to each other about the axis L of the second connecting end portion 6 while an annular projection 11b provided on the outer surface of the insertion end 11a of the corresponding pipe 11 is engaged with a retainer accommodated in the female connector 10 as shown in FIG. 2. As the coupling hole 18a of the first bracket 16 and the coupling hole 22a of the second bracket 20 are coincided with each other, a bolt 23 is inserted into the two holes 18a and 22a for locking with a nut 24. Accordingly, the female connector 10 and the corresponding pipe 11 can be joined to each other as not allowed to be moved along their axial direction and turned about the axis L of the second connecting end portion 6.

Figure 4:
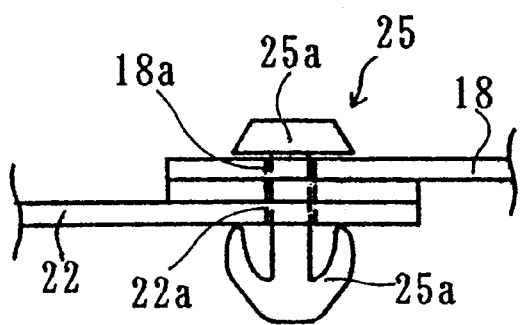
FIG. 4 is a side view schematically showing a joining state with an anchor clip on the piping structure of the present invention.

The coupling between the first bracket 16 and the second bracket 20 is not limited to a combination of the bolt 23 and the nut 24 mentioned above and may be implemented with the use of an anchor clip 25, for example, as shown in FIG. 4. More particularly, when an anchor-like accepting portion 25a of the anchor clip 25 is elastically deformed and inserted into the coupling hole 18a of the coupling tab 18 of the first bracket 16 and the coupling hole 22a of the coupling tab 22 of the second bracket 20, the two tabs 18 and 22 are sandwiched and fixed between the anchor-like accepting portion 25a and a head 25b of the anchor clip 25 in an original opening state. A stress orthogonal to the axial direction which is developed in the tightening with bolt and nut is not exerted in the tightening with the anchor clip 25. Hence, the corresponding pipe 11 and the resin tube 9 can be prevented from being unfavorably deformed or bent or the like.

Figure 5:
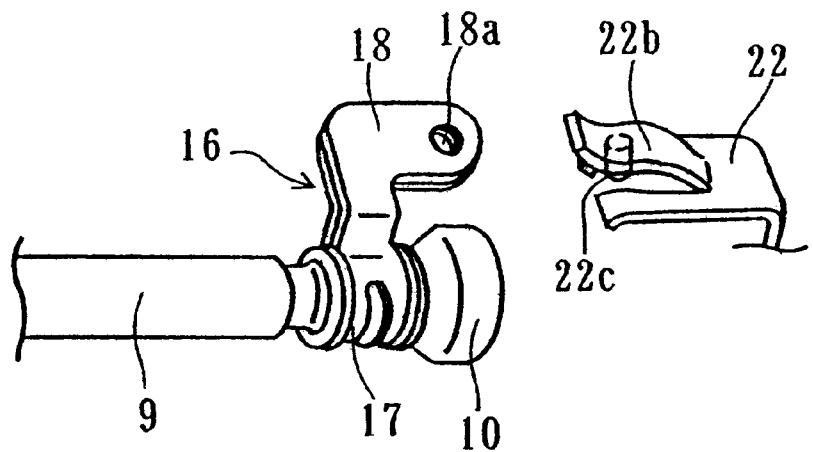
FIG. 5 is a perspective view schematically showing another embodiment of the piping structure according to the present invention.
Figure 6:
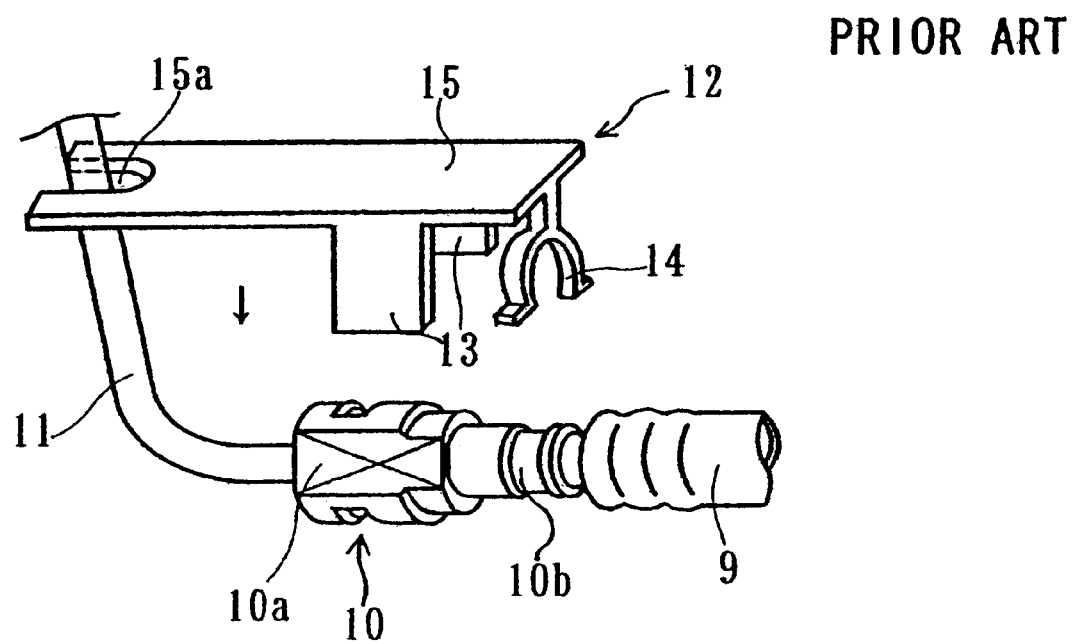
FIG. 6 is a perspective view schematically showing a conventional piping structure.

Alternatively, the coupling tab 22 of the second bracket 20 may have an ear portion 22b forming a clip and made movable elastically by cutting and raising at the free end as shown in FIG. 5. As the coupling tab 18 of the first bracket 16 is axially held with the ear portion 22b, a projection 22c provided on the ear portion 22b of the coupling tab 22 is snapped into the coupling hole 18a of the coupling tab 18 thus to join between the female connector 10 and the corresponding pipe 11 for allowing no turning. The coupling can be conducted by one-touch action and the connecting tab integrally provided with the fastening means will contribute to the overall cost down.

According to the present invention, the coupling between the first bracket 16 and the second bracket 20 enables to securely join between the resin tube 9 and the corresponding pipe 11, thus inhibiting the turning movement of the female connector 10 and the corresponding pipe 11 relative to each other. As a result, the annular sealing member such as an O ring mounted in the housing of the female connector 10 remains free from sliding movements over the outer periphery of the insertion end 11a of the corresponding pipe 11 and will hardly be rubbed and worn out but provides its excellent sealing effect for a long-run operation. Also, the resin tube 9 is securely fitted on the female connector 10 and the turning relative to each other can be avoided.

Moreover, when the female connector 10 is joined to the corresponding pipe 11, the connection region of the first bracket 16 couples with the connection region of the second bracket 20 (at the alignment of the two coupling holes 18a and 22a in the FIG.) thus eliminating fault engagement between the female connector 10 and the corresponding pipe 11. In case while the connection regions being connected, even if the connection is made with a small clearance kept between the small-diameter region 2b of the retainer 2 in the female connector 10 (FIG. 7) and the annular projection 11b of the corresponding pipe 11b, the small-diameter region 2b and the annular projection 11b can be prevented from being rubbed and worn out by the action of vibration in use.

The first bracket 16 or the second bracket 20 may have a retaining hole provided therein, for example, denoted by 25 in FIGS. 1 and 2, for anchoring by a bolt to the chassis or engine or the like of a vehicle. The resin tube 9 and the corresponding pipe 11 are not limited to a linear configuration shown in FIGS. 1 and 2 but may be a desired bent form. The means for mounting the first bracket 16 and the second bracket 20 is not limited to the description but may be implemented by any known scheme.

What is claimed is:

1. A piping structure for use in a vehicle having a female connector and a corresponding pipe to be connected with the female connector, both arranged to join each other while allowing no relative turning movements, comprising:

the female connector of a tubular shape having a first connecting end portion thereof extending straight for connection to a resin tube and a second connecting end portion thereof extending straight for connection to the corresponding pipe;

the resin tube fixedly inserted at one end to the first connecting end portion of the female connector and extending to the other end;

the corresponding pipe having an insertion end thereof arranged for joining coaxially and turnably by snap fastening to the second connecting end portion of the female connector and extending along the axial direction; and a first bracket fixedly mounted to the periphery of the female connector for non-turning and a second bracket fixedly mounted to the corresponding pipe for non-turning, wherein when the insertion end of the corresponding pipe is inserted and connected with the second connecting end portion of the female connector, the first bracket and the second bracket turn about the axis of the second connecting end portion of the female connector relative to each other so that connecting portion of the first bracket and connecting portion of the second bracket are coincided and coupled with each other.

2. The piping structure according to claim 1, wherein the connecting portions of the first bracket and the second bracket are coupling holes across which a bolt is threaded with a nut or an anchor clip is inserted for tightening.

3. The piping structure according to claim 1 or 2, wherein at least either the first bracket or the second bracket includes a means for mounting to the vehicle.

* * * * *

UNITED STATES PATENT AND TRADEMARK OFFICE
CERTIFICATE OF CORRECTION

PATENT NO.    : 6,318,762 B1
DATED         : November 20, 2001
INVENTOR(S)   : Inoue It is certified that error appears in the above-identified patent and that said Letters Patent is hereby corrected as shown below:

<u>Title page</u>,
Item [30], Foreign Application Priority Data information should read:

-- [30]    Foreign Application Priority Data

Feb. 24, 2000   (JP) ………………………………….. 2000-047230 --

Signed and Sealed this

Eleventh Day of June, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,318,762 B2
DATED : November 20, 2001
INVENTOR(S) : Inoue

It is certified that error appears in the above-identified patent and that said Letters Patent is hereby corrected as shown below:

<u>Title page,</u>
Item [73], the Assignee information is incorrect. Item [73] should read:

-- [73] Assignee: Tokai Rubber Industries, Ltd.,
Komaki-shi (JP) --

Signed and Sealed this

Nineteenth Day of November, 2002

*Attest:*

JAMES E. ROGAN
*Attesting Officer*     *Director of the United States Patent and Trademark Office*